United States Patent [19]

Kemp, Jr. et al.

[11] Patent Number: 4,756,746
[45] Date of Patent: * Jul. 12, 1988

[54] PROCESS OF PRODUCING FINE SPHERICAL PARTICLES

[75] Inventors: Preston B. Kemp, Jr., Athens; Walter A. Johnson, Towanda, both of Pa.

[73] Assignee: GTE Products Corporation, Stamford, Conn.

[*] Notice: The portion of the term of this patent subsequent to Dec. 8, 2004 has been disclaimed.

[21] Appl. No.: 904,316

[22] Filed: Sep. 8, 1986

[51] Int. Cl.$^4$ ............................................. B22F 1/00
[52] U.S. Cl. ...................... 75/0.5 B; 75/0.5 BA; 75/0.5 BB; 75/0.5 BC; 264/15
[58] Field of Search ............ 75/0.5 R, 0.5 B, 0.5 BB, 75/0.5 BA, 0.5 BC; 264/15; 219/121 P, 121 PY, 121 PB

[56] References Cited

U.S. PATENT DOCUMENTS 3,974,245 8/1976 Cheney et al. ................... 264/10
4,264,354 4/1981 Cheethan ........................ 75/0.5 B

FOREIGN PATENT DOCUMENTS 02864 8/1984 European Pat. Off. ........... 75/0.5 B

Primary Examiner—Christopher W. Brody
Attorney, Agent, or Firm—Donald R. Castle; L. Rita Quatrini

[57] ABSTRACT

A powdered material and a process for producing the material are disclosed. The powdered material consists essentially of spherical particles selected from the group consisting of metals, metal alloys, ceramic glasses, crystalline ceramic materials, and combinations of these. The material is essentially free of elliptical shaped material and elongated particles having rounded ends. The material has a particle size of less than about 20 micrometers. The process for making the spherical particles involves mechanically reducing the size of a starting material to produce a finer powder the major portion of which has a particle size of less than about 20 micrometers. The finer powder is entrained in a carrier gas and passed through a high temperature zone at a temperature above the melting point of the powder to melt at least about 50% of the powder and form the spherical particles of the melted portion. The powder is then directly solidifed.

5 Claims, 5 Drawing Sheets

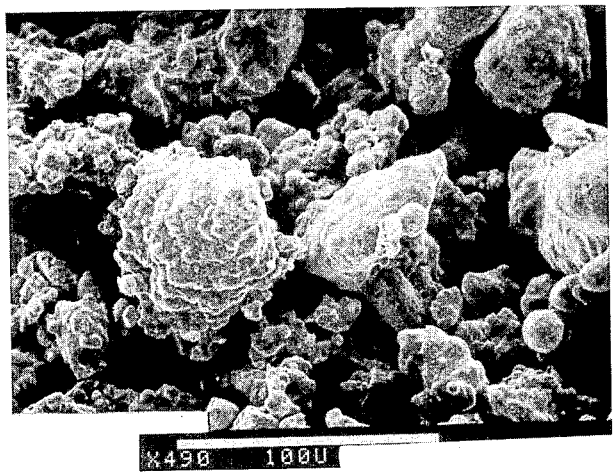
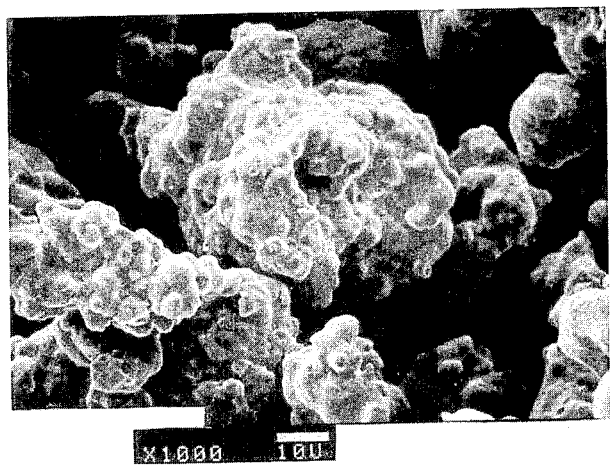
Figure 1 - SEM photomicrographs of typical starting
material of this invention (above, 1a, 490x, below, 1b, 1000x)

Figure 2 - SEM photomicrographs of typical size-reduced
material of this invention (above, 500x, below, 1000x)

Figure 3 - SEM photomicrograph of typical fine spherical particles of this invention (above, 3a 500x, below, 3b 1000x)

Figure 4 - SEM photomicrographs of typical fine spherical particles of this invention after classification
4a                 4b
(above, 510x, below, 1000x)

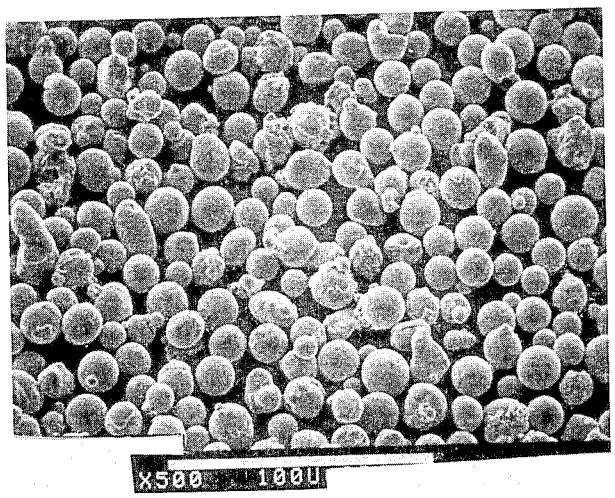
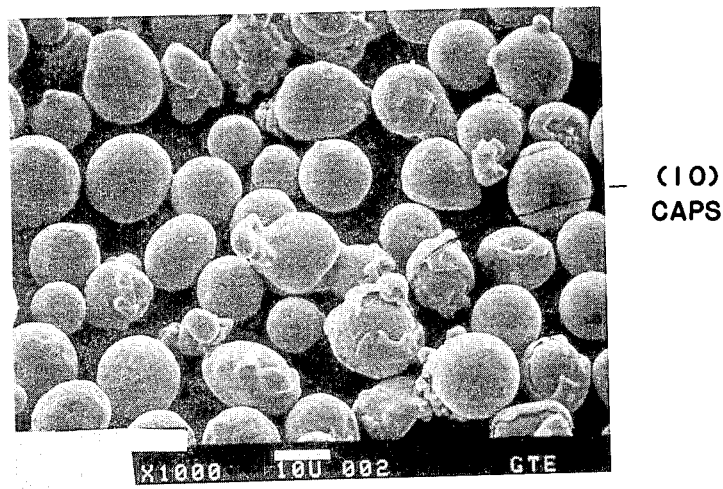
FIG. 5a
FIG. 5b
(10) CAPS
Figure 5 — SEM photomicrograph of typical fine gas atomized powder (prior art). Note presence of "caps".
5a 5b
(above, 500x, below, 1000x)

PROCESS OF PRODUCING FINE SPHERICAL PARTICLES

CROSS REFERENCE TO RELATED APPLICATIONS

This invention is related to the following applications: Ser. No. 905,015, entitled "Iron Group Based and Chromium Based Fine Spherical Metal Particles and Process for Producing Same," Ser. No. 904,997, entitled "Spherical Refractory Metal Based Powder Particles and Process For Producing Same," Ser. No. 905,011, now U.S. Pat. No. 4,711,661 entitled "Spherical Copper Based Powder Particles And Process For Producing Same," Ser. No. 905,013, now U.S. Pat. No. 4,711,660 entitled "Spherical Precious Metal Based Powder Particles And Process For Producing Same," Ser. No. 904,318, entitled "Spherical Light Metal Powder Particles And Process For Producing Same," and Ser. No. 904,317, entitled "Spherical Titanium Based Powder Particles And Process For Producing Same," all of which are filed concurrently herewith and all of which are by the same inventors and assigned to the same assignee as the present application.

BACKGROUND OF THE INVENTION

This invention relates to fine spherical powder particles and to the process for producing the particles which involves mechanically reducing the size of a starting material followed by high temperature processing to produce fine spherical particles. More particularly the high temperature process is a plasma process.

U.S. Pat. No. 3,909,241 to Cheney et al relates to free flowing powders which are produced by feeding agglomerates through a high temperature plasma reactor to cause at least partial melting of the particles and collecting the particles in a cooling chamber containing a protective gaseous atmosphere where the particles are solidified.

Fine spherical metal particles are useful in applications such as filters, precision press and sinter parts, and injection molded parts.

Some of the better commercial processes for producing such metal powder particles are by gas or water atomization. Only a small percentage of the powder produced by atomization is less than about 20 microns. Therefore, yields are low and metal powder costs are high as a result.

In European Patent Application No. WO8402864 published Aug. 2, 1984, there is disclosed a process for making ultra-fine powder by directing a stream of molten droplets at a repellent surface whereby the droplets are broken up and repelled and thereafter solidified as described therein. While there is a tendency for spherical particles to be formed after rebounding, it is stated that the molten portion may form elliptical shaped or elongated particles with rounded ends.

A process for efficiently producing fine spherical metal particles would be an advancement in the art.

SUMMARY OF THE INVENTION

In accordance with one aspect of this invention, there is provided a powdered material which consists essentially of spherical particles selected from the group consisting of metals, metal alloys, ceramic glasses, crystalline ceramic materials, and combinations of these. The material is essentially free of elliptical shaped material and free of elongated particles having rounded ends. The material has a particle size of less than about 20 micrometers.

In accordance with another aspect of this invention, there is provided a process for producing the above described powdered material. The process involves mechanically reducing the size of a starting material to produce a finer powder the major portion of which has a particle size of less than about 20 micrometers. The finer powder is entrained in a carrier gas and passed through a high temperature zone at a temperature above the melting point of the powder to melt at least about 50% of the powder and form the spherical particles of the melted portion. The powder is then directly solidified.

BRIEF DESCRIPTION OF THE FIGURES

FIGS. 1a and b are SEM photomicrographs of a typical starting material of this invention, an iron based alloy, at magnifications of about 490× and about 1000× respectively.

FIGS. 5a and b are SEM photomicrographs of a typical fine spherical powder at magnifications of about 500× and about 1000× respectively, made by gas atomization.

The above photomicrographs have a scale in microns from which approximate particle sizes of the particles shown can be determined.

DETAILED DESCRIPTION OF THE INVENTION

For a better understanding of the present invention, together with other and further objects, advantages and capabilities thereof, reference is made to the following disclosure and appended claims in connection with the above described figures and description of some of the aspects of the invention.

The starting material of this invention can be essentially any type of material. However, the preferred materials are metals, metal alloys, ceramic glasses, and crystalline ceramic materials, and combinations thereof, with metals and metal alloys being the especially preferred materials. The major criteria for producing ceramic materials by this process is that they maintain chemical stability up to their melting point. FIG. 1 shows an iron based alloy starting material.

The size of the starting material is first mechanically reduced to produce a finer powder material. The starting material can be of any size or diameter initially, since one of the objects of this invention is to reduce the diameter size of the material from the initial size. The size of the major portion of the material is reduced to less than about 20 microns in diameter.

The mechanical size reduction can be accomplished by standard techniques such as by attritor, rotary, or vibratory milling with attritor milling being the preferred technique.

Figure 2A:
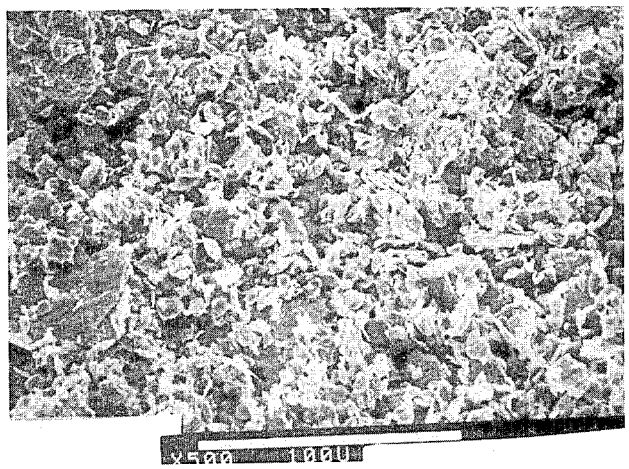
FIGS. 2a and b are SEM photomicrographs of a typical attritor milled powder feedstock for producing the spherical particles of this invention at magnifications of about 500× and about 1000× respectively.
Figure 2B:
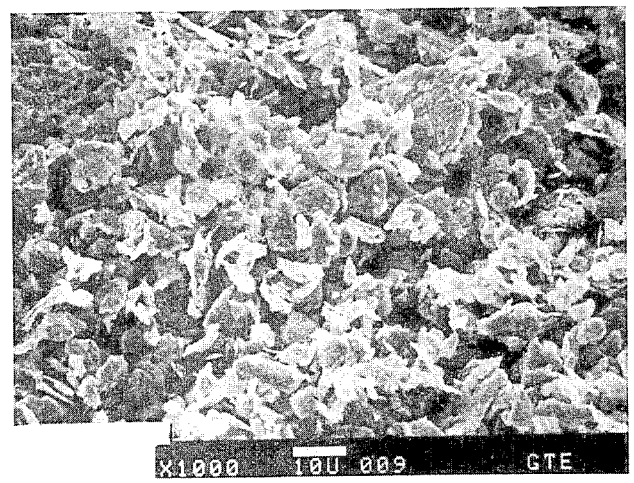

A preferred attritor mill is manufactured by Union Process under the trade name of "The Szegvari Attritor". This mill is a stirred media ball mill. It is comprised of a water jacketed stationary cylindrical tank filled with small ball type milling media and a stirrer which consists of a vertical shaft with horizontal bars. As the stirrer rotates, balls impact and shear against one another. If metal powder is introduced into the mill, energy is transferred through impact and shear from the media to the powder particles, causing cold work and fracture fragmentation of the powder particles. This leads to particle size reduction. The milling process may be either wet or dry, with wet milling being the preferred technique. During the milling operation the powder can be sampled and the particle size measured. When the desired particle size is attained the milling operation is considered to be complete. The particle size measurement is done by conventional methods as sedigraph, micromerograph, and microtrac with micromerograph being the preferred method. FIG. 2 shows iron based powder which has been attritor milled.

The resulting reduced size material or finer powder is then dried if it has been wet such as by a wet milling technique.

If necessary, the reduced size material is exposed to high temperature and controlled environment to remove carbon and oxygen, etc.

The reduced size material is then entrained in a carrier gas such as argon and passed through a high temperature zone at a temperature above the melting point of the finer powder for a sufficient time to melt at least about 50% by weight of the finer powder and form essentially fine particles of the melted portion. Some additional particles can be partially melted or melted on the surface and these can be spherical particles in addition to the melted portion. The preferred high temperature zone is a plasma.

Details of the principles and operation of plasma reactors are well known. The plasma has a high temperature zone, but in cross section the temperature can vary typically from about 5500° C. to about 17,000° C. The outer edges are at low temperatures and the inner part is at a higher temperature. The retention time depends upon where the particles entrained in the carrier gas are injected into the nozzle of the plasma gun. Thus, if the particles are injected into the outer edge, the retention time must be longer, and if they are injected into the inner portion, the retention time is shorter. The residence time in the plasma flame can be controlled by choosing the point at which the particles are injected into the plasma. Residence time in the plasma is a function of the physical properties of the plasma gas and the powder material itself for a given set of plasma operating conditions and powder particles. Larger particles are more easily injected into the plasma while smaller particles tend to remain at the outer edge of the plasma jet or are deflected away from the plasma jet.

After the material passes through the plasma and cools, it is rapidly solidified. Generally the major weight portion of the material is converted to spherical particles. Generally greater than about 75% and most typically greater than about 85% of the material is converted to spherical particles by the high temperature treatment. Nearly 100% conversion to spherical particles can be attained. The major portion of the spherical particles are less than about 20 micrometers in diameter. The particle size of the plasma treated particles is largely dependent of the size of the material obtained in the mechanical size reduction step. As much as about 100% of the spherical particles can be less than about 20 micrometers.

More preferred particle sizes are less than about 15 micrometers in diameter and most preferably less than about 10 micrometers in diameter.

It is preferred that the particles be greater than about 3 micrometers in diameter.

Figure 3A:
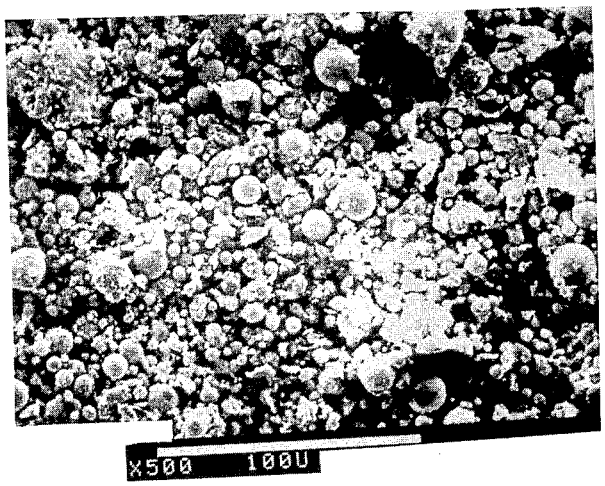
FIGS. 3a and b are SEM photomicrographs of a typical fine spherical powder produced by the process of this invention at magnifications of about 500× and 1000× respectively. The powder has not been classified.
Figure 3B:
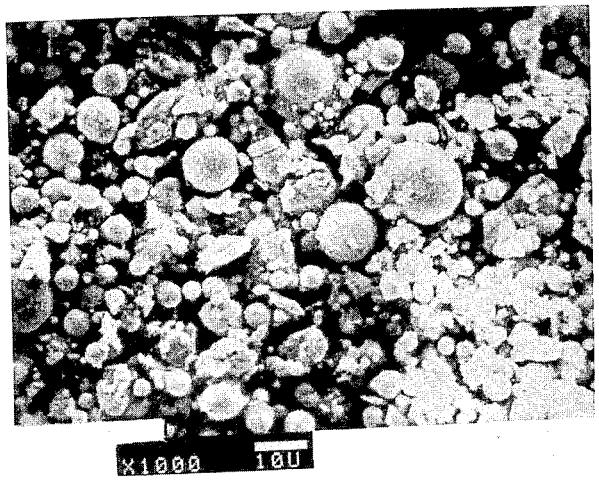

FIGS. 3a and b are SEM photomicrographs of iron based material produced by the plasma treatment of mechanically reduced material. The material is not preclassified. It can be seen that the spherical particles of the present invention are different from those of the gas atomization process because the latter have caps on the particles as is shown in gas atomized particles in FIG. 5b (10), whereas those of the present invention shown in FIGS. 3 and 4 do not have such caps. Caps are the result of particle-particle collision in the molten or semi-molten state during the gas atomization event.

Figure 4A:
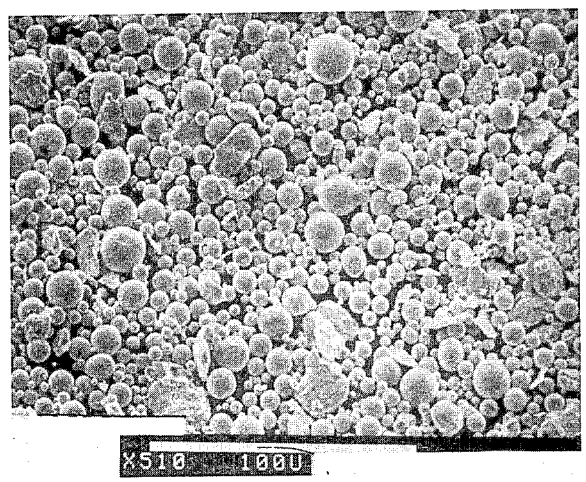
FIGS. 4a and b are SEM photomicrographs of a typical fine spherical powder produced by the process of this invention at magnifications of about 500× and about 1000× respectively. The powder has been classified to obtain the desired particle size.
Figure 4B:
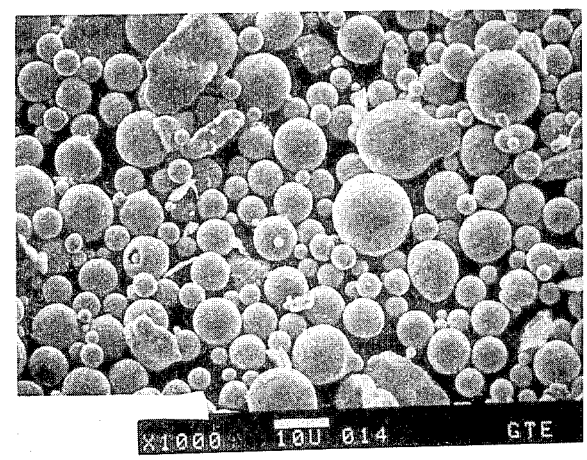

After cooling and resolidification, the resulting high temperature treated material can be classified to remove the major spheroidized particle portion from the essentially non-spheroidized minor portion of particles and to obtain the desired particle size. The classification can be done by standard techniques such as screening or air classification. The unmelted minor portion can then be reprocessed according to the invention to convert it to fine spherical particles. FIGS. 4a and b shows pictures of classified particles of the present invention in which the non-spherical portion has been removed.

The powdered materials of this invention are essentially spherical particles which are essentially free of elliptical shaped material and essentially free of elongated particles having rounded ends. These characteristics can be present in the particles made by the process described in European Patent Application No. WO8402864 as previously mentioned.

Spherical particles have an advantage over non-spherical particles in injection molding and pressing and sintering operations. The lower surface area of spherical particles as opposed to non-spherical particles of comparable size, and the flowability of spherical particles makes spherical particles easier to mix with binders and easier to dewax.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing fine spherical powder particles, said process comprising:
   (a) mechanically reducing the size of the starting material from which said powder is to be made to produce a finer powder, the major portion of which has a particle size of less than about 20 micrometers;
   (b) entraining said finer powder in a carrier gas and passing said powder through a high temperature zone at a temperature above the melting point of said finer powder, said temperature being from about 5500° C. to about 17,000° C., said temperature being created by a plasma jet, to melt at least about 50% by weight of said finer powder to form essentially fine spherical particles of said melted portion; and (c) rapidly and directly resolidifying the resulting high temperature treated material, while said material is in flight, to form fine spherical particles having a particle size of less than about 20 micrometers in diameter, said particles being essentially free of elliptical shaped material and essentially free of elongated particles having rounded ends.

2. A process of claim 1 wherein the size of said starting material is reduced by attritor milling said material to produce said finer powder.

3. A process of claim 1 wherein after said resolidification, said high temperature treated material is classified to obtain the desired particle size of said spherical particles.

4. A process of claim 1 wherein said starting material is selected from the group consisting of metals, metal alloys, ceramic glasses, crystalline ceramic materials, and combinations thereof.

5. A process of claim 4 wherein said starting material is selected from the group consisting of metals and metal alloys.

* * * * *